US012747991B2

(12) United States Patent
Kato et al.

(10) Patent No.: US 12,747,991 B2
(45) Date of Patent: Sep. 29, 2026

(54) SENSOR COMPONENT

(71) Applicant: Yazaki Corporation, Tokyo (JP)

(72) Inventors: Shinpei Kato, Makinohara (JP); Shingo Nomoto, Makinohara (JP); Keisuke Yamauchi, Makinohara (JP); Shimpei Ando, Makinohara (JP); Tadashi Ogawa, Makinohara (JP)

(73) Assignee: Yazaki Corporation, Tokyo (JP)

( * ) Notice: Subject to any disclaimer, the term of this patent is extended or adjusted under 35 U.S.C. 154(b) by 263 days.

(21) Appl. No.: 18/673,550

(22) Filed: May 24, 2024

(65) Prior Publication Data

US 2025/0003807 A1 Jan. 2, 2025

(30) Foreign Application Priority Data

Jun. 29, 2023 (JP) ................................ 2023-107129

(51) Int. Cl.
*G01K 1/14* (2021.01)
*G01K 1/08* (2021.01)

(52) U.S. Cl.
CPC *G01K 1/14* (2013.01); *G01K 1/08* (2013.01)

(58) Field of Classification Search
CPC .................................. G01K 1/14; G01K 1/08
USPC ................................................ 374/208, 148
See application file for complete search history.

(56) References Cited

U.S. PATENT DOCUMENTS 4,630,940 A * 12/1986 Ostertag ................ G01K 13/02 73/198
2026/0104293 A1* 4/2026 Maystorov ............... G01K 1/14

FOREIGN PATENT DOCUMENTS

| | | | | |
|---|---|---|---|---|
| CN | 108414030 A * | 8/2018 | ............. G01D 21/02 |
| CN | 117629496 A * | 3/2024 | ............... G01K 1/16 |
| EP | 2 485 023 A2 | 8/2012 | |
| EP | 3067670 A1 * | 9/2016 | ........... H01R 13/645 |

* cited by examiner

*Primary Examiner* — Mirellys Jagan
(74) *Attorney, Agent, or Firm* — Sughrue Mion, PLLC

(57) ABSTRACT

A sensor component to be press-fitted into a mounting hole includes a sensor body, detection means, and a pair of O-rings. The sensor body includes a primary mold portion in which the detection means is embedded, a secondary mold portion provided on an opposite side of the primary mold portion in the press-fitting direction of the mounting hole, and a border portion between the primary mold portion and the secondary mold portion. The primary mold portion includes a first arrangement portion on which one of the pair of O-rings is arranged. The secondary mold portion includes a second arrangement portion on which the other of the pair of O-rings is arranged. The second arrangement portion, the border portion, and the first arrangement portion are arranged in this recited order in the press-fitting direction.

6 Claims, 3 Drawing Sheets

SENSOR COMPONENT

TECHNICAL FIELD

The present invention relates to a sensor component.

BACKGROUND

Conventionally, a sensor component for measuring the temperature of a device casing, which is a measurement target, has been known (for example, see Patent Document 1). The sensor component described in Patent Document 1 is assembled into a mounting hole provided in a device housing to measure the temperature of a measurement target. The sensor component includes a temperature measurement unit, a primary mold portion in a rod shape in which a portion of the temperature measurement unit is embedded, a secondary mold portion covering the primary mold portion, and a metal cap that is bent and crimped onto the tip of the primary mold portion. The temperature measurement unit includes a pair of lead wires, and a temperature detection element that is electrically connected between the pair of lead wires and detects the temperature of the measurement target. The temperature detection element is provided so as to be exposed from the tip of the primary mold portion, is covered with a metal cap, and is configured to sense the temperature of a fluid, i.e., the measurement target.

RELATED ART

Patent Document

Patent Document 1: EP2485023 (A2)

SUMMARY OF THE INVENTION

Problem to be Solved by the Invention

However, the sensor component described in Patent Document 1 is provided with protrusions and fine irregularities on the outer surface of the primary mold portion which are covered with the secondary mold portion in order to prevent fluid from entering between the primary mold portion and the secondary mold portion (i.e., the inside), and therefore, the shape of the primary mold portion often becomes complicated and the amount of resin in the primary mold portion often increases.

It is an object of an embodiment to provide a sensor component that has a simplified shape to alleviate infiltration of fluid into the sensor component.

Solution to Problem

In order to achieve the above problem and achieve the above object, an invention according to a first aspect is a sensor component to be press-fitted into a mounting hole provided in a housing to detect a physical quantity of a measurement target, the sensor component including a sensor body in a rod shape to be press-fitted into the mounting hole, detection means provided on a side of the sensor body in a press-fitting direction of the mounting hole, the detection means being configured to detect the physical quantity of the measurement target, and a pair of O-rings arranged on the sensor body and capable of coming into close contact with an inner surface of the mounting hole, wherein the sensor body is made by two-component molding, wherein the sensor body includes a primary mold portion which is made by a primary molding and in which the detection means embedded; and a secondary mold portion which is made by a secondary molding and which is provided on an opposite side of the primary mold portion in the press-fitting direction of the mounting hole, and a border portion between the primary mold portion and the secondary mold portion, wherein the primary mold portion includes a first arrangement portion on which one of the pair of O-rings is arranged, the secondary mold portion includes a second arrangement portion on which the other of the pair of O-rings is arranged, and the second arrangement portion, the border portion, and the first arrangement portion are arranged in this recited order in the press-fitting direction.

Advantageous Effects of the Invention

According to an invention of the first aspect, the shape can be simplified, and infiltration of fluid into the inside can be alleviated.

DETAILED DESCRIPTION OF THE EXEMPLARY EMBODIMENT

Figure 1:
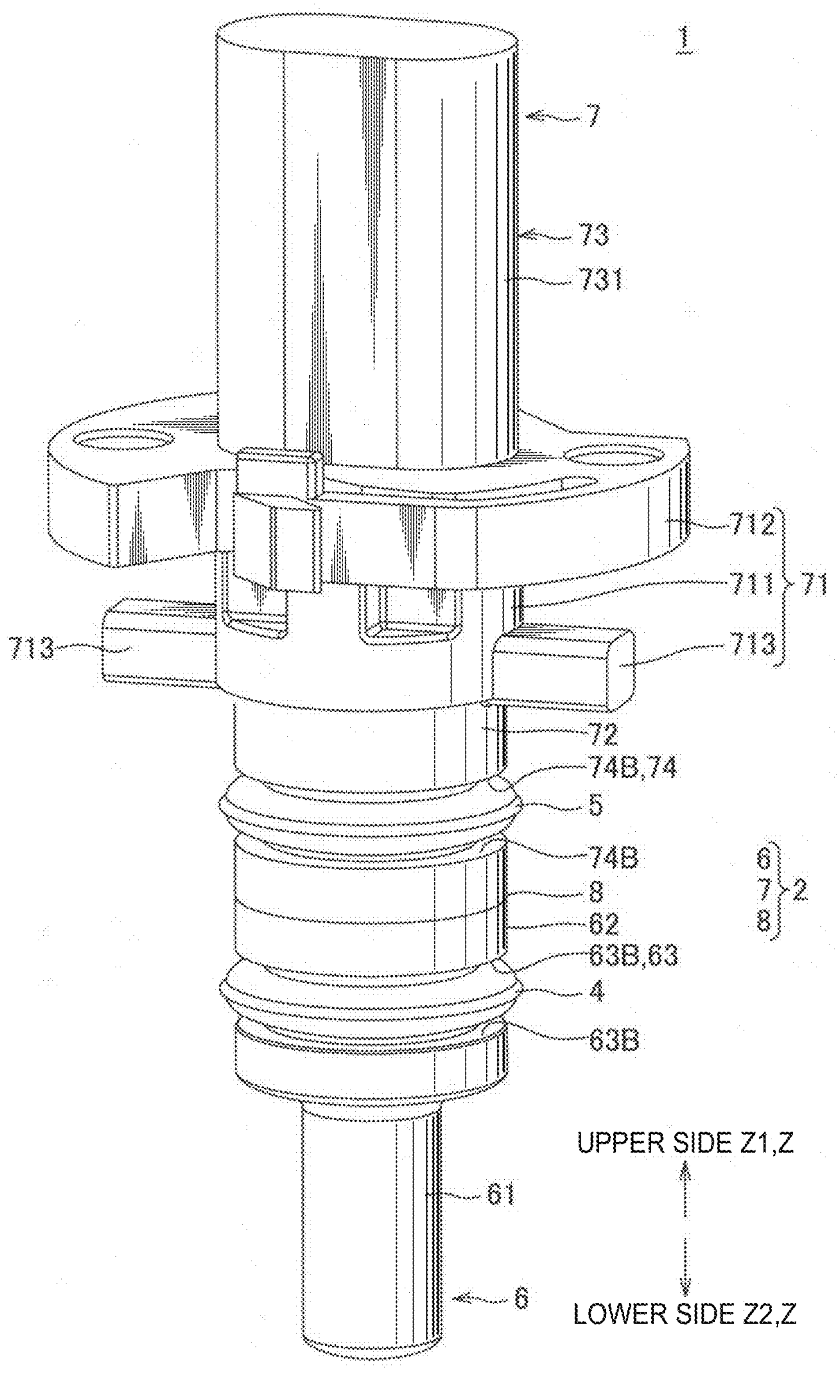
FIG. 1 is a perspective view illustrating a sensor component according to an embodiment of the present invention.
Figure 2:
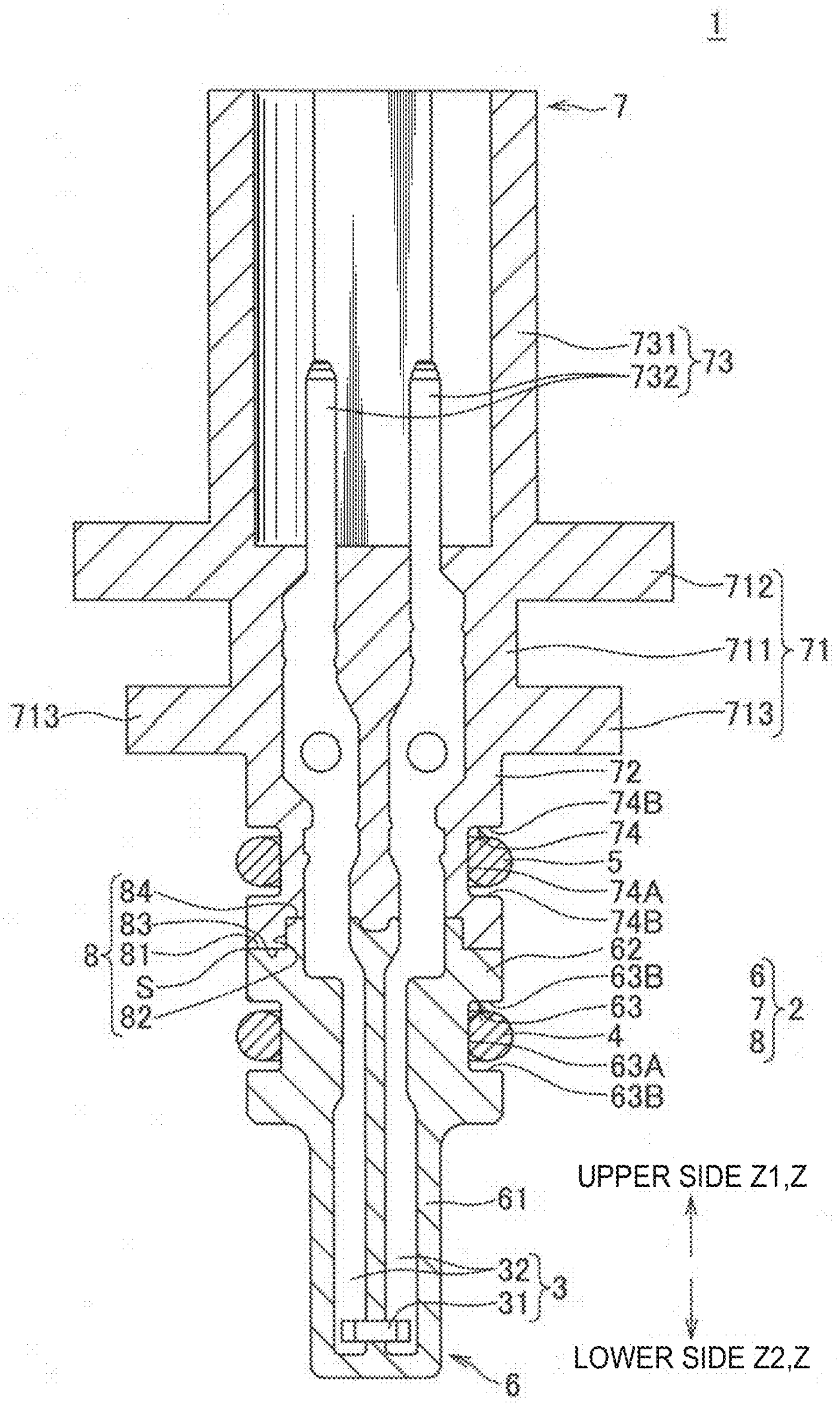
FIG. 2 is a vertical cross-sectional view of the sensor component illustrated in FIG. 1.
Figure 3:
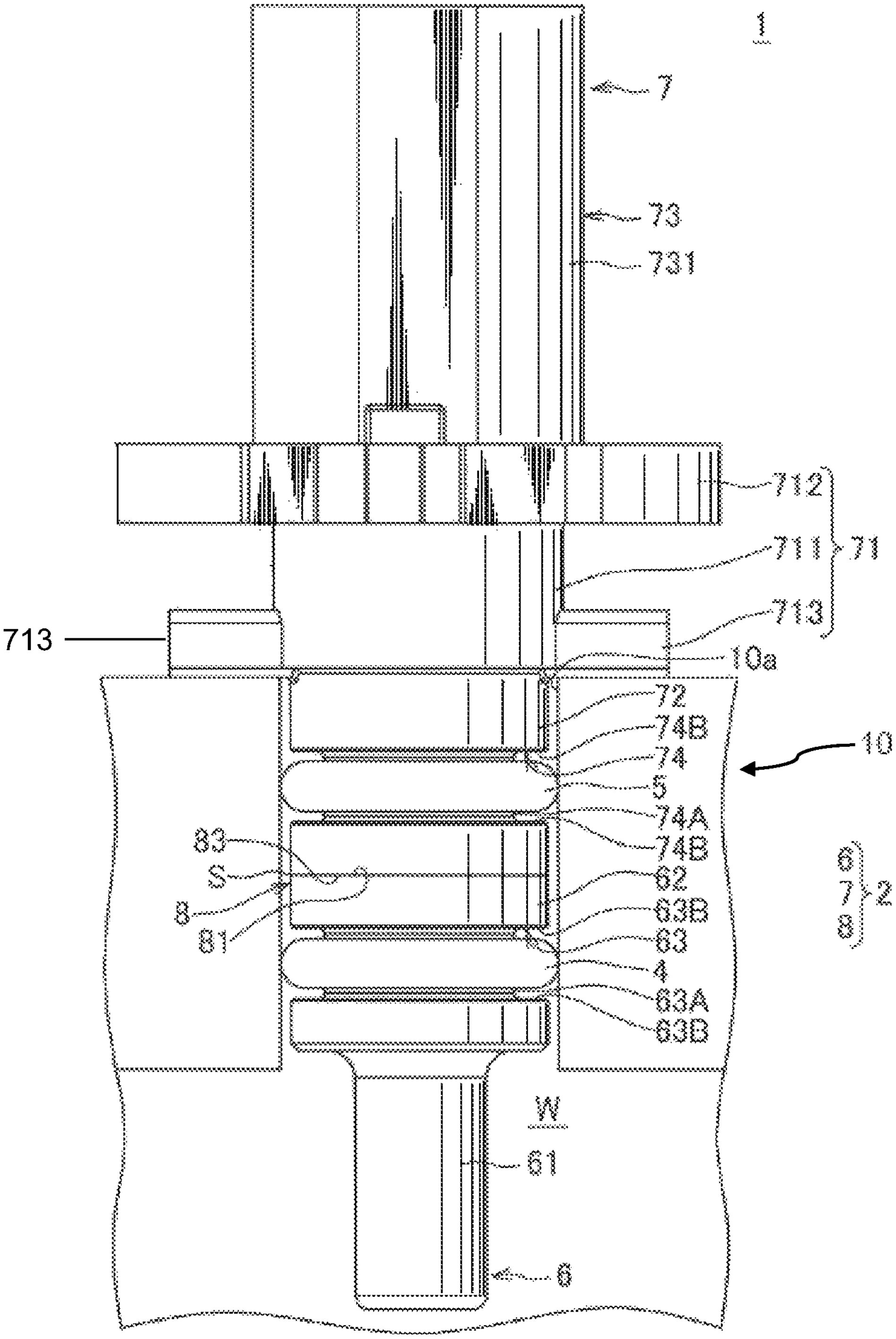
FIG. 3 is a cross-sectional view illustrating the sensor component press-fitted into a mounting hole of a housing.

Embodiments of the present invention are hereinafter described with reference to FIGS. 1 to 3. FIG. 1 is a perspective view illustrating a sensor component 1 according to an embodiment of the present invention. FIG. 2 is a vertical cross-sectional view of the sensor component 1 illustrated in FIG. 1. FIG. 3 is a cross-sectional view illustrating the sensor component 1 press-fitted into a mounting hole 10*a* of a housing 10.

As illustrated in FIGS. 1 and 3, the sensor component 1 according to the embodiment is press-fitted into the mounting hole 10*a* provided in the housing 10 (illustrated in FIG. 3) and is used to measure the temperature (physical quantity) of cooling water W (measurement target, illustrated in FIG. 3) provided in the housing 10.

As illustrated in FIGS. 1, 2, the sensor component 1 includes a sensor body 2 press-fitted into the mounting hole 10*a*, a temperature measurement unit 3 (illustrated in FIG. 2) embedded in the sensor body 2 and including a detection element 31 (detection means, illustrated in FIG. 2) for detecting the temperature of the measurement target, and a pair of O-rings 4, 5 provided on the sensor body 2. Hereinafter, one of the pair of O-rings 4, 5 may be referred to as a "first O-ring 4" and the other as a "second O-ring 5".

Hereinafter, the direction in which the mounting hole 10*a* of the housing 10 penetrates may be referred to as a "vertical direction Z", the press-fitting direction of the sensor component 1 into the mounting hole 10*a* may be referred to as a "lower side Z2", and the direction opposite thereto may be referred to as an "upper side Z1".

The sensor body 2 is made by two-component molding, and the temperature measurement unit 3, which is described later, is embedded by insert molding. The sensor body 2 includes a primary mold portion 6 made by primary molding, a secondary mold portion 7 made by secondary molding, and a border portion 8 between the primary mold portion 6 and the secondary mold portion 7 (which may be hereinafter referred to as a border portion 8). The primary mold portion 6 and the secondary mold portion 7 are coaxially provided.

As illustrated in FIGS. 1, 2, the primary mold portion 6 includes a detection unit 61 in a cylindrical shape made by embedding a part of the temperature measurement unit 3 including the detection element 31 (illustrated in FIG. 2), and a first arrangement portion 62 including a first arrangement portion 63 which is continuous with the upper side Z1 of the detection unit 61 and on which the first O-ring 4 is arranged.

The detection unit 61 is made by embedding a part of the temperature measurement unit 3 including the detection element 31, and is configured in a solid cylindrical shape with an axis extending in the vertical direction Z.

As illustrated FIG. 2, the first arrangement portion 62 is provided coaxially with the detection unit 61 and has a cylindrical shape with a larger diameter than the detection unit 61. The first arrangement portion 62 is provided with a first arrangement portion 63 in which the first O-ring 4, which is described later, can be arranged. As illustrated FIG. 2, the first arrangement portion 63 includes a first bottom surface 63A that is provided at a position recessed toward the center axis from the outer peripheral surface of the first arrangement portion 62 and continuous around the axis of the first arrangement portion 62; and a pair of first side surfaces 63B, 63B rising from both ends of the first bottom surface 63A in the vertical direction Z, and the first arrangement portion 63 is configured to have a groove shape on the outer peripheral surface of the first arrangement portion 62. With the first O-ring 4 arranged in the first arrangement portion 63, displacement of first O-ring 4 in the vertical direction Z is regulated by the pair of first side surfaces 63B, 63B.

As illustrated in FIGS. 1, 2, the secondary mold portion 7 includes a secondary mold portion body 71, a second arrangement portion 72 continuous to the lower side Z2 of the secondary mold portion body 71 and including a second arrangement portion 74 on which a second O-ring 5 is arranged, and a connector portion 73 continuous to the upper side Z1 of the secondary mold portion body 71 and connectable to an external device (not illustrated).

The secondary mold portion body 71 includes a cylindrical portion 711 in a cylindrical shape provided coaxially with the primary mold portion 6 and configured to have a diameter larger than the diameter of the second arrangement portion 72, which is described later, a flange portion 712 provided at the upper end of the cylindrical portion 711 and protruding in the thickness direction, and a pair of protruding portions 713, 713 provided at the upper end of the cylindrical portion 711 and protruding from the outer peripheral surface of the cylindrical portion 711 in a direction away from each other.

As illustrated FIG. 2, the second arrangement portion 72 is provided coaxially with the secondary mold portion body 71 and the first arrangement portion 62, and has a cylindrical shape having approximately the same diameter dimension as the first arrangement portion 62. This second arrangement portion 72 is provided with a second arrangement portion 74 in which a second O-ring 5, which is described later, can be arranged. As illustrated FIG. 2, the second arrangement portion 74 includes a second bottom surface 74A provided at a position recessed toward the center axis side from the outer peripheral surface of the second arrangement portion 72 and continuous around the axis of the second arrangement portion 72, and a pair of second side surfaces 74B, 74B rising from both ends of the second bottom surface 74A in the vertical direction Z, and the second arrangement portion 74 is configured to have a groove shape on the outer peripheral surface of the second arrangement portion 72. With the second O-ring 5 arranged in the second arrangement portion 74, the pair of second side surfaces 74B, 74B restrict displacement of the second O-ring 5 in the vertical direction Z.

As illustrated FIG. 2, the connector portion 73 includes a connector portion body 731 in a cylindrical shape provided coaxially with the secondary mold portion body 71 and whose axis is in the vertical direction Z, and a pair of external connection portions 732, 732, which are respective parts of a pair of conductor portions 32, 32 constituting the temperature measurement unit 3, which is described later, and are provided to be exposed inside the connector portion body 731. The connector portion 73 is connected to an external device (not illustrated) and is configured to transmit the temperature of the measurement target.

As illustrated FIG. 2, the border portion 8 includes a first upper surface 81 (interface) in a flat circular shape of the first arrangement portion 62 of the primary mold portion 6, a protruding portion 82 provided at the center of the first upper surface 81 and protruding from the center, a second lower surface 83 (interface) in a flat circular shape of the second arrangement portion 72 of the secondary mold portion 7, and a recessed portion 84 provided at the center of the second lower surface 83 and recessed from the center to fit onto the protruding portion 82.

The first upper surface 81 has a circular shape with a flat surface perpendicular to the axis of the primary mold portion 6. The second lower surface 83 has a circular shape with a flat surface perpendicular to the axis of the secondary mold portion 7. These first upper surface 81 and the second lower surface 83 are configured to face each other with a very small space S therebetween when the sensor component 1 is completed.

Here, in generally-available resin molded products manufactured by two-component molding, the space between the primary mold portion and the secondary mold portion may be sealed using, for example, a potting agent, whereas, in the present embodiment, the space S between the first upper surface 81 and the second lower surface 83 is not sealed using a potting agent or the like. As a result, the very small space S is made between the first upper surface 81 and the second lower surface 83 when the sensor component 1 is completed. In the present embodiment, heat transfer between primary mold portion 6 and secondary mold portion 7 is blocked by the very small space S between the first upper surface 81 and the second lower surface 83, so that heat radiation from the primary mold portion 6 to the secondary mold portion 7 is alleviated.

As illustrated FIG. 2, the temperature measurement unit 3 includes a detection element 31 that detects the temperature of the measurement target, and a pair of conductor portions 32, 32 connected to both ends of the detection element 31. The pair of conductor portions 32, 32 is such that a portion of each conductor portion 32 is embedded in the in primary mold portion 6 and the secondary mold portion body 71 and the second arrangement portion 72 of the secondary mold portion 7, and the external connection portions 732 which is another portion is provided to be exposed inside the connector portion 73.

The first O-ring 4 is made of a water-resistant material. The first O-ring 4 is configured in a ring shape and can be arranged in the first arrangement portion 63. With the first O-ring 4 being arranged in the first arrangement portion 63, the outer peripheral surface of the first O-ring 4 is provided on the side away from the central axis with respect to the outer peripheral surface of the first arrangement portion 62, and with the sensor component 1 being press-fitted into the mounting hole 10*a*, the outer peripheral surface of the first O-ring 4 is configured to come into elastic contact with the inner peripheral surface of the mounting hole 10*a*.

The second O-ring 5 is made of an oil-resistant material. The second O-ring 5 is configured in a ring shape and is configured to be arranged in the second arrangement portion 74. With the second O-ring 5 being arranged in the second arrangement portion 74, the outer peripheral surface of the second O-ring 5 is provided on the side away from the central axis with respect to the outer peripheral surface of the second arrangement portion 72, and with the sensor component 1 being press-fitted into the mounting hole 10*a*, the outer peripheral surface of the second O-ring 5 is configured to come into elastic contact with the inner peripheral surface of the mounting hole 10*a*.

When the sensor component 1 is manufactured, the detection element 31 is electrically connected between the pair of conductor portions 32, 32, and the detection element 31 and the pair of conductor portions 32, 32 are placed at a predetermined position in a mold (not illustrated). In this state, molten resin is injected into the mold (primary injection of molten resin). As the injection proceeds, the primary injection of the molten resin into the inside of the mold is completed. Thereafter, the molten resin is hardened within the mold. As a result, the primary mold portion 6 in which the detection element 31 and the pair of conductor portions 32, 32 are partially embedded is molded.

Thereafter, molten resin is injected into the inside of the mold (secondary injection of molten resin). As the secondary injection proceeds, the secondary injection of the molten resin into the mold is completed. Thereafter, the molten resin is hardened within the mold. As a result, the secondary mold portion 7 is molded overlapping the primary mold portion 6. In this case, the first upper surface 81 of the primary mold portion 6 and the second lower surface 83 of the secondary mold portion 7 face each other, and the very small space S is made between the first upper surface 81 and the second lower surface 83.

Thereafter, the first O-ring 4 is arranged in the first arrangement portion 63 provided in the primary mold portion 6, and the second O-ring 5 is arranged in the second arrangement portion 74 provided in the secondary mold portion 7. In this way, sensor component 1 is completed. When the sensor component 1 is completed, the very small space S is made between the first upper surface 81 and the second lower surface 83 in the border portion 8 between the primary mold portion 6 and the secondary mold portion 7. That is, in the present embodiment, the sensor component 1 is completed without sealing the very small space S between the first upper surface 81 and the second lower surface 83.

Subsequently, when the completed sensor component 1 is to be assembled into the mounting hole 10*a* of the housing 10, the tip of the sensor component 1 is brought closer to the upper end of the mounting hole 10*a* to be inserted (press-fitted) thereinto. As the insertion proceeds, the sensor component 1 reaches a predetermined position in the mounting hole 10*a*. In this case, the outer peripheral surface of the first O-ring 4 is in elastic contact with the inner peripheral surface of the mounting hole 10*a*, and the outer peripheral surface of the second O-ring 5 is in elastic contact with the inner peripheral surface of the mounting hole 10*a*. In this state, the second O-ring 5, the border portion 8 between the primary mold portion 6 and the secondary mold portion 7, and the first O-ring 4 are arranged in this order in the press-fitting direction of the sensor component 1. In this way, the assembly of the sensor component 1 into the mounting hole 10*a* of the housing 10 is completed.

According to the embodiment explained above, the sensor component 1 includes a sensor body 2, a detection element 31 (detection means), and a pair of O-rings 4, 5, and the sensor body 2 includes a primary mold portion 6 which is made by a primary molding and in which the detection element 31 (detection means) is embedded, a secondary mold portion 7 which is made by a secondary molding and which is provided on an opposite side of the primary mold portion 6 in the press-fitting direction of the mounting hole 10*a*, and a border portion 8 between the primary mold portion 6 and the secondary mold portion 7, wherein the primary mold portion 6 includes a first arrangement portion 63 on which a first O-ring 4 (one of the pair of O-rings 4, 5) is arranged, the secondary mold portion 7 includes a second arrangement portion 74 on which a second O-ring 5 (the other of the pair of O-rings 4, 5) is arranged, and the second arrangement portion 74, the border portion 8, and the first arrangement portion 63 are arranged in this recited order in the press-fitting direction. Accordingly, with the sensor component 1 being press-fitted into the mounting hole 10*a*, the border portion 8 between the primary mold portion 6 and the secondary mold portion 7 is sealed by the first O-ring 4 and the second O-ring 5, so that infiltration of water (fluid) into the border portion 8 can be alleviated. Specifically, the arrangement portions 63, 74 in which the O-rings 4, 5 are arranged are provided on the primary mold portion 6 and the secondary mold portion 7, respectively, to achieve a simple structure, i.e., simplify the shape, while infiltration of water into the border portion 8 can be alleviate.

Furthermore, the border portion 8 includes the first upper surface 81 (interface) of the primary mold portion 6 and the second lower surface 83 (interface) of the secondary mold portion 7 provided to face each other; and a very small space S provided between the first upper surface 81 and the second lower surface 83. The space S blocks heat transfer between the first molded product and the second molded product, so that reduction in responsiveness due to heat radiation from the first molded product to the second molded product can be alleviated.

Furthermore, the first arrangement portion 63 is configured to have a groove shape on an outer peripheral surface of the primary mold portion 6, and the second arrangement portion 74 is configured to have a groove shape on an outer peripheral surface of the secondary mold portion 7. Accordingly, with the first O-ring 4 being arranged in the first arrangement portion 63, movement of the first O-ring 4 in the vertical direction Z is restricted, and with the second O-ring 5 being arranged in the second arrangement portion 74, movement of the second O-ring 5 in the vertical direction Z is restricted, so that infiltration of water (fluid) into the border portion 8 (inside) can be further alleviated.

Furthermore, in a case where water that is the measurement target is contained on the side in the press-fitting direction of the mounting hole 10*a*, and oil is contained on the opposite side in the press-fitting direction of the mounting hole 10*a*, then, one of the pair of O-rings 4, 5 is made of a water-resistant material, and the other of the pair of O-rings 4, 5 is made of an oil-resistant material. In this way, the material of the O-rings and, for example, the diameters of the O-rings can be freely selected for the primary mold portion 6 and the secondary mold portion 7, so that sensors can be designed according to the external environment. Accordingly, the sensor structure suitable for the purpose can be provided.

The present invention is not limited to the embodiment described above, and includes other configurations that can achieve the object of the present invention, and the present invention also includes modifications such as those shown below.

In the embodiment, there is a very small space S between the first upper surface 81 and the second lower surface 83 without sealing it using a potting agent or the like, but the present invention is not limited thereto. It is understood that the scope of the present invention includes a sensor component that is made without being sealed but using a potting agent or the like. No matter whether the space S that is made without being sealed but using a potting agent or the like is the very small space S or an air layer between the first upper surface 81 and the second lower surface 83 slightly spaced apart, such configuration is to be included in the scope of the present invention.

In addition, although the best configuration, method, and the like for carrying out the present invention are disclosed in the above description, the present invention is not limited thereto. That is, although the present invention has been particularly illustrated and described primarily with respect to the particular embodiment, a person skilled in the art can make various modifications to the embodiment described above in terms of shape, material, quantity, and other detailed configurations without departing from the scope of the technical idea and purpose of the present invention. Therefore, because the descriptions that limit the shape, material, and the like disclosed above are provided as examples to facilitate understanding of the present invention, and are not intended to limit the present invention, a description with a name of a member, from which some or all of the limitations on the shape, material, and the like are deleted, is to be included in the present invention.

LIST OF REFERENCE SIGNS

1 sensor component
2 sensor body
31 detection element (detection means)
4 first O-ring (one of a pair of O-rings)
5 second O-ring (the other of the pair of O-rings)
6 primary mold portion
63 first arrangement portion
7 secondary mold portion
74 second arrangement portion
8 border portion
81 first upper surface (interface)
83 second lower surface (interface)
S space
10 housing
10*a* mounting hole
W cooling water (measurement target)

What is claimed is:

1. A sensor component to be press-fitted into a mounting hole provided in a housing to detect a physical quantity of a measurement target, the sensor component comprising:

a sensor body in a rod shape to be press-fitted into the mounting hole;

a detection means provided on a side of the sensor body in a press-fitting direction of the mounting hole, the detection means being configured to detect the physical quantity of the measurement target; and a pair of O-rings arranged on the sensor body and capable of coming into close contact with an inner surface of the mounting hole, wherein the sensor body is made by two-component molding, wherein the sensor body includes:

a primary mold portion which is made by a primary molding and in which the detection means is embedded;

a secondary mold portion which is made by a secondary molding and which is provided on an opposite side of the primary mold portion in the press-fitting direction of the mounting hole; and a border portion between the primary mold portion and the secondary mold portion, wherein the primary mold portion includes a first arrangement portion on which one of the pair of O-rings is arranged, the secondary mold portion includes a second arrangement portion on which the other of the pair of O-rings is arranged, and the second arrangement portion, the border portion, and the first arrangement portion are arranged in this recited order in the press-fitting direction of the mounting hole.

2. The sensor component according to claim 1, wherein the first arrangement portion is configured to have a groove shape on an outer peripheral surface of the primary mold portion, and the second arrangement portion is configured to have a groove shape on an outer peripheral surface of the secondary mold portion.

3. The sensor component according to claim 1, wherein, in a case where water is the measurement target and is contained on a side in the press-fitting direction of the mounting hole, and oil is contained on an opposite side in the press-fitting direction of the mounting hole, one of the pair of O-rings is made of a water-resistant material, and the other of the pair of O-rings is made of an oil-resistant material.

4. The sensor component according to claim 1, wherein the border portion includes:

respective interfaces of the primary mold portion and the secondary mold portion provided to face each other; and a very small space provided between the respective interfaces.

5. The sensor component according to claim 4, wherein the first arrangement portion is configured to have a groove shape on an outer peripheral surface of the primary mold portion, and the second arrangement portion is configured to have a groove shape on an outer peripheral surface of the secondary mold portion.

6. The sensor component according to claim 4, wherein, in a case where water is the measurement target and is contained on a side in the press-fitting direction of the mounting hole, and oil is contained on an opposite side in the press-fitting direction of the mounting hole, one of the pair of O-rings is made of a water-resistant material, and the other of the pair of O-rings is made of an oil-resistant material.

* * * * *